(12) United States Patent
Reinke et al.

(10) Patent No.: US 12,409,089 B2
(45) Date of Patent: Sep. 9, 2025

(54) SLING BARS AND LIFT ASSEMBLIES INCLUDING SLING BARS

(71) Applicant: LIKO RESEARCH & DEVELOPMENT AB, Luleå (SE)

(72) Inventors: Christian H. Reinke, York, SC (US); Todd P. O'Neal, Fairfield, OH (US); James Walke, Batesville, IN (US)

(73) Assignee: LIKO Research & Development AB, Luleå (SE)

( * ) Notice: Subject to any disclaimer, the term of this patent is extended or adjusted under 35 U.S.C. 154(b) by 696 days.

(21) Appl. No.: 17/474,329

(22) Filed: Sep. 14, 2021

(65) Prior Publication Data

US 2022/0079824 A1 Mar. 17, 2022

Related U.S. Application Data (60) Provisional application No. 63/079,105, filed on Sep. 16, 2020.

(51) Int. Cl.
*A61G 7/10* (2006.01)
*F16M 13/02* (2006.01)

(52) U.S. Cl.
CPC ......... *A61G 7/1078* (2013.01); *A61G 7/1042* (2013.01); *A61G 7/1051* (2013.01); *F16M 13/02* (2013.01)

(58) Field of Classification Search
CPC .. A61G 7/1078; A61G 7/1042; A61G 7/1051; A61G 7/1073; A61G 7/1061; F16M 13/02
USPC .......................................................... 5/85.1
See application file for complete search history.

(56) References Cited

U.S. PATENT DOCUMENTS

| | | | |
|---|---|---|---|
| 6,201,195 B1* | 3/2001 | Carey ................. | A61G 7/1094 177/144 |
| 6,523,195 B1* | 2/2003 | Rodier ................ | A61G 7/1015 5/89.1 |
| 2005/0098510 A1* | 5/2005 | Lom .................... | A47F 7/147 211/13.1 |
| 2010/0043140 A1* | 2/2010 | Chepurny ........... | A61G 7/1015 5/85.1 |
| 2011/0100249 A1 | 5/2011 | Ipsen | |
| 2015/0107020 A1* | 4/2015 | Andersson .......... | A61G 7/1042 5/83.1 |
| 2016/0184156 A1* | 6/2016 | Faucher .............. | A61G 7/1034 5/83.1 |

(Continued)

OTHER PUBLICATIONS

European Search Report, EP Application No. 21196156.0, Mar. 2, 2022 (9 pages).

(Continued)

*Primary Examiner* — Justin C Mikowski
*Assistant Examiner* — Luke Hall
(74) *Attorney, Agent, or Firm* — Dinsmore & Shohl LLP (57) ABSTRACT

A sling bar includes a frame defining a central hub, a first hook extending from the central hub, and a second hook extending from the central hub. The central hub includes a wall defining an internal hollow region and an external hub surface, the internal hollow region shaped and sized to receive a ferromagnetic insert therein, and one or more niches formed within the wall and recessed into the wall from the external hub surface, the one or more niches arranged radially around the internal hollow region and sized and shaped to receive a hand control device.

20 Claims, 6 Drawing Sheets

(56) References Cited

U.S. PATENT DOCUMENTS

2016/0259374 A1* 9/2016 Breiwa ................ H01F 7/0247
2021/0221565 A1* 7/2021 Lapelosa ................ B65D 25/32

OTHER PUBLICATIONS

"Compatible for phones magnetic stand, Remote Control Holder. For Apple TV Remote Mounting Shelf Magnetic Holder For Apple TV 4", Ali Express, link: https://www.aliexpress.com/i/32950019076. html, Retrieved on Dec. 24, 2019, p. 1-10.
Extended European Search Report for Appln. No. 24211575.6-1113, mailed Mar. 18, 2025, 8 pages.

\* cited by examiner

FIG. 6

SLING BARS AND LIFT ASSEMBLIES INCLUDING SLING BARS

CROSS-REFERENCE TO RELATED APPLICATIONS

The present application claims the benefit of priority to U.S. Provisional Patent Application No. 63/079,105, filed Sep. 16, 2020, the entirety of which is herein incorporated by reference.

TECHNICAL FIELD

The present specification generally relates to sling bars and lift assemblies that include sling bars and, more specifically, to sling bars including magnetic mounting structures.

BACKGROUND

Caregivers may use a lift system to lift a subject. The lift system may generally include a motorized lift unit operable to lift and lower a sling bar. A hand control device may be communicatively coupled to the motorized lift unit such that a user, using the hand control device, may control the motorized lift unit to raise or lower the sling bar. The user may need to hold the hand control device throughout use, which may be inconvenient. Moreover, existing attachment or mounting points for a hand control device may be off-centered if mounted to the sling bar, which may cause the sling bar to tilt or become unbalanced when the hand control device when attached. This may lead to difficulty in placing slings, or other devices, on the sling bar when the hand control unit is attached.

SUMMARY

In a first aspect A1, a sling bar includes a frame defining a central hub, a first hook extending from the central hub, and a second hook extending from the central hub. The central hub includes a wall defining an internal hollow region and an external hub surface, the internal hollow region shaped and sized to receive a ferromagnetic insert therein, and one or more niches formed within the wall and recessed into the wall from the external hub surface, the one or more niches arranged radially around the internal hollow region and sized and shaped to receive a hand control device. A second aspect A1 incudes the first aspect A1, further including the ferromagnetic insert positioned within the internal hollow region, the ferromagnetic insert defining a cavity, and a mounting linkage arranged to mount the sling bar to a lifting device, wherein the mounting linkage is positioned within the internal hollow region of the ferromagnetic insert and extends externally from the central hub. A third aspect A1 includes the second aspect A2, wherein the ferromagnetic insert includes a first opening into the cavity and a second opening into the cavity opposite the first opening, wherein the second opening has a larger diameter than the first opening. A fourth aspect A4 includes the third aspect A3, wherein the mounting linkage includes a retention flange comprising a larger diameter than the first opening of the ferromagnetic insert. A fifth aspect A5 includes any of the second aspect A2 through the fourth aspect A4, further including a cap coupled to the central hub and enclosing the ferromagnetic insert within the internal hollow region of the central hub. A sixth aspect A6 includes the fifth aspect A5, wherein the cap includes a base plate, and a positioning core extending from the base plate, wherein the positioning core is positioned within the internal hollow region of the central hub and contacts the mounting linkage. A seventh aspect A7 includes the sixth aspect A6, wherein the base plate is press-fit into the internal hollow region of the central hub. An eighth aspect A8 includes either the sixth aspect A6 or the seventh aspect A7, wherein the cap further includes one or more retention legs extending from the base plate. A ninth aspect A9 includes the eighth aspect A8, wherein the central hub includes a retention ring recessed into the wall of the central hub within the internal hollow region, and one or more hooking portions of the one or more retention legs are positioned within the retention ring thereby securing the cap to the central hub within the internal hollow region. A tenth aspect A10 includes any preceding aspect, wherein the one or more niches comprise a polygonal shape that mates with a magnetic mounting block of the hand control device. An eleventh aspect A11 includes any preceding aspect, wherein the one or more niches include a plurality of niches positioned circumferentially around an axis of the central hub.

In a twelfth aspect A12, a kit of parts includes the sling bar of any one of preceding aspect, and instructions for at least one of assembling the sling bar, assembling the sling bar to a lift mechanism, and/or care instructions for cleaning and/or sterilization of the sling bar.

In a thirteenth aspect A13, a lift assembly includes a lifting device including a hand control device, and a sling bar. The sling bar includes a frame defining a central hub, a first hook extending from the central hub, and a second hook extending from the central hub. The central hub includes a wall defining an internal hollow region and an external hub surface, the internal hollow region shaped and sized to receive a ferromagnetic insert therein, and one or more niches formed within the wall and recessed into the wall from the external hub surface, the one or more niches arranged radially around the internal hollow region and sized and shaped to receive the hand control device. A fourteenth aspect A14 includes the thirteenth aspect A13, wherein the hand control device includes a mounting block sized and shaped to mate with the one or more. A fifteenth aspect A15 includes the fourteenth aspect A14, wherein the mounting block of the hand control device is a magnet. A sixteenth aspect A16 includes the fourteenth aspect A14 or the fifteenth aspect A15, wherein a shape of one or more niches substantially corresponds to a shape of the mounting block of the hand control device. A seventeenth aspect A17 includes any of the thirteenth aspect A13 through the sixteenth aspect A16, wherein the sling bar further includes the ferromagnetic insert positioned within the internal hollow region, the ferromagnetic insert defining a cavity, and a mounting linkage that mounts the sling bar to the lifting device, wherein the mounting linkage is positioned within the internal hollow region of the ferromagnetic insert and extends externally from the central hub. An eighteenth aspect A18 includes the seventeenth aspect A17, wherein the ferromagnetic insert includes a first opening in to the cavity and a second opening into the cavity opposite the first opening, wherein the second opening has a larger diameter than the first opening. A nineteenth aspect A19 includes the eighteenth aspect A18, wherein the mounting linkage includes a retention flange comprising a larger diameter than the first opening of the ferromagnetic insert. A twentieth aspect A20 includes any of the seventeenth aspect A17 through the nineteenth aspect A19, further including a cap coupled to the central hub and enclosing the ferromagnetic insert within the internal hollow region of the central hub. A twenty-first aspect A21 includes the twentieth aspect A20, wherein the cap includes a base plate, and a positioning core extending from the base plate, wherein the positioning core is positioned within the internal hollow region of the central hub and contacts the mounting linkage. A twenty-second aspect A22 includes the twenty-first aspect A21, wherein the base plate is press-fit into the internal hollow region of the central hub. A twenty-third aspect A23 includes either the twenty-first aspect A21 or the twenty-second aspect A22, wherein the cap further includes one or more retention legs extending from the base plate. A twenty-fourth aspect A24 includes the twenty-third aspect, wherein the central hub includes a retention ring recessed into the wall of the central hub within the internal hollow region, and one or more hooking portions of the one or more retention legs are positioned within the retention ring thereby securing the cap to the central hub within the internal hollow region. A twenty-fifth aspect A25 includes any of the thirteenth aspect A13 through the twenty-fourth aspect A24, wherein the one or more niches include a polygonal shape that mates with a magnetic mounting block of the hand control device. A twenty-sixth aspect A26 includes any of the thirteenth aspect A13 through the twenty-fifth aspect A25, wherein the one or more niches include a plurality of niches positioned circumferentially around an axis of the central hub. A twenty-seventh aspect A27 includes any of the thirteenth aspect A13 through the twenty-fifth aspect A25, wherein the one or more niches include a first niche arranged along a first side of the frame and a second niche arranged along a second side of the frame opposite the first niche.

In a twenty-eight aspect A28 a method of assembling a sling bar includes forming a frame defining a central hub, a first hook extending from the central hub, and a second hook extending from the central hub. Forming the central hub includes forming a wall defining an internal hollow region and an external hub surface, the internal hollow region shaped and sized to receive a ferromagnetic insert therein, and forming one or more niches within the wall and recessed into the wall from the external hub surface, the one or more niches arranged radially around the internal hollow region and sized and shaped to receive a hand control device. A twenty-ninth aspect A29 includes the twenty-eight aspect A28, further including inserting the ferromagnetic insert into the internal hollow region, such that the one or more niches are positioned adjacent the ferromagnetic insert, wherein the ferromagnetic insert defines a cavity, a first opening into the cavity, and a second opening into the cavity opposite the first opening. A thirtieth aspect A30 includes the twenty-ninth aspect, further including inserting a mounting linkage within the cavity of the ferromagnetic insert such that the mounting linkage extends externally from the central hub, wherein the mounting linkage is mountable to a lifting device. A thirty-first aspect includes the thirtieth aspect A31, wherein inserting the mounting linkage through the ferromagnetic insert includes passing the mounting linkage through the first opening and the second opening of the ferromagnetic insert, wherein the second opening has a larger diameter than the first opening. A thirty-second aspect A32 includes the thirty-first aspect A31, wherein passing the mounting linkage through the first opening and the second opening of the ferromagnetic insert includes inserting the mounting linkage through the ferromagnetic insert until a retention flange of the mounting linkage contacts a bearing positioned within the ferromagnetic insert. A thirty-third aspect A33 includes any of the thirtieth aspect A30 through the thirty-second aspect A32, further including coupling a cap to the central hub thereby enclosing the ferromagnetic insert within the internal hollow region of the central hub. A thirty-fourth aspect A34 includes the thirty-third aspect, wherein coupling the cap to the central hub includes forming a press-fit between the cap and the central hub within the internal hollow region. A thirty-fifth aspect A35 includes any of the thirtieth aspect A30 through the thirty-fourth aspect A34, further including pressing a cap including a base plate and a positioning core extending from the base plate into the internal hollow region of the central hub such that the positioning core is contacted to the mounting linkage. A thirty-sixth aspect A36 includes the thirty-fifth aspect A35, further including flexing one or more retention legs extending from the base plate, each of the one or more retention legs comprising a hooking portion which hooks into a retention ring recessed into the wall of the central hub within the internal hollow region, thereby securing the cap to the central hub within the internal hollow region. A thirty-seventh aspect A37 includes either the thirty-fifth aspect A35 or the thirty-sixth aspect A36, wherein coupling the cap to the central hub includes forming a press-fit between the base plate and the central hub within the internal hollow region. A thirty-eighth aspect A38 includes the thirty-seventh aspect A37, wherein forming the one or more niches includes forming the one or more niches into a polygonal shape. A thirty-ninth aspect A39 includes either the thirty-seventh aspect A37 or the thirty-eighth aspect A38, wherein forming the one or more niches includes forming a plurality of niches circumferentially around an axis of the central hub.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to various aspects of sling bars for lift assemblies, examples of which are illustrated in the accompanying drawings. Whenever possible, the same reference numerals will be used throughout the drawings to refer to the same or like parts.

An illustrative sling bar of the present disclosure is depicted in FIGS. 1-5. In general, illustrative sling bars include a frame defining a central hub, a first hook extending from the central hub and a second hook extending from the central hub. The central hub generally includes a wall defining an internal hollow region and an external hub surface. The internal hollow region is shaped and sized to receive a ferromagnetic insert therein. One or more niches are formed within the wall and recessed into the wall from the external hub surface. The one or more niches are arranged radially around the internal hollow region and sized and shaped to receive a hand control device. For example, the hand control device may include a mount, such as a magnetic mounting block, which is configured to interface with a niche of the one or more niches, such that the hand control device becomes magnetically coupled to the ferromagnetic insert positioned within the internal hollow region. Accordingly, when not held in the hand of a user, the hand control device may be mounted to the sling bar such that it is secured out of the way (e.g., does not hinder use of the sling bar) but remains accessible to the user and/or operator. Because the hand control device may be removably mounted to the center of the sling bar, the weight of the hand control device may not cause the sling bar to tilt one way or another as the center of gravity of the sling bar with the hand control device mounted thereto will remain concentrated at the central hub. Additionally, in some embodiments a hand control device may operate wirelessly or otherwise untethered via a physical medium to the lift unit. In such embodiments, the one or more niches may aid in preventing the hand control device from being lost, as it will be convenient to place the hand control device back on the central hub versus another location where it may be misplaced. These and additional embodiments are described in further detail below.

As used herein, a "longitudinal direction" may refer to a first longitudinal direction (e.g., in the +X direction of the coordinate axes of FIG. 1) and/or a second longitudinal direction (e.g., in the −X direction of the coordinate axes of FIG. 1), a "lateral direction" may refer to a first lateral direction (e.g., in the +Z direction of the coordinate axes of FIG. 1) and/or a second lateral direction (e.g., in the −Z direction of the coordinate axes of FIG. 1), where the lateral direction is transverse to the longitudinal direction, and a "vertical direction" may refer to a first vertical direction (e.g., in the +Y direction of the coordinate axes of FIG. 1, an upward direction) and/or a second vertical direction (e.g., in the −Y direction of the coordinate axes of FIG. 1, a downward direction), where the vertical direction is transverse to the lateral direction and the longitudinal direction.

Figure 1:
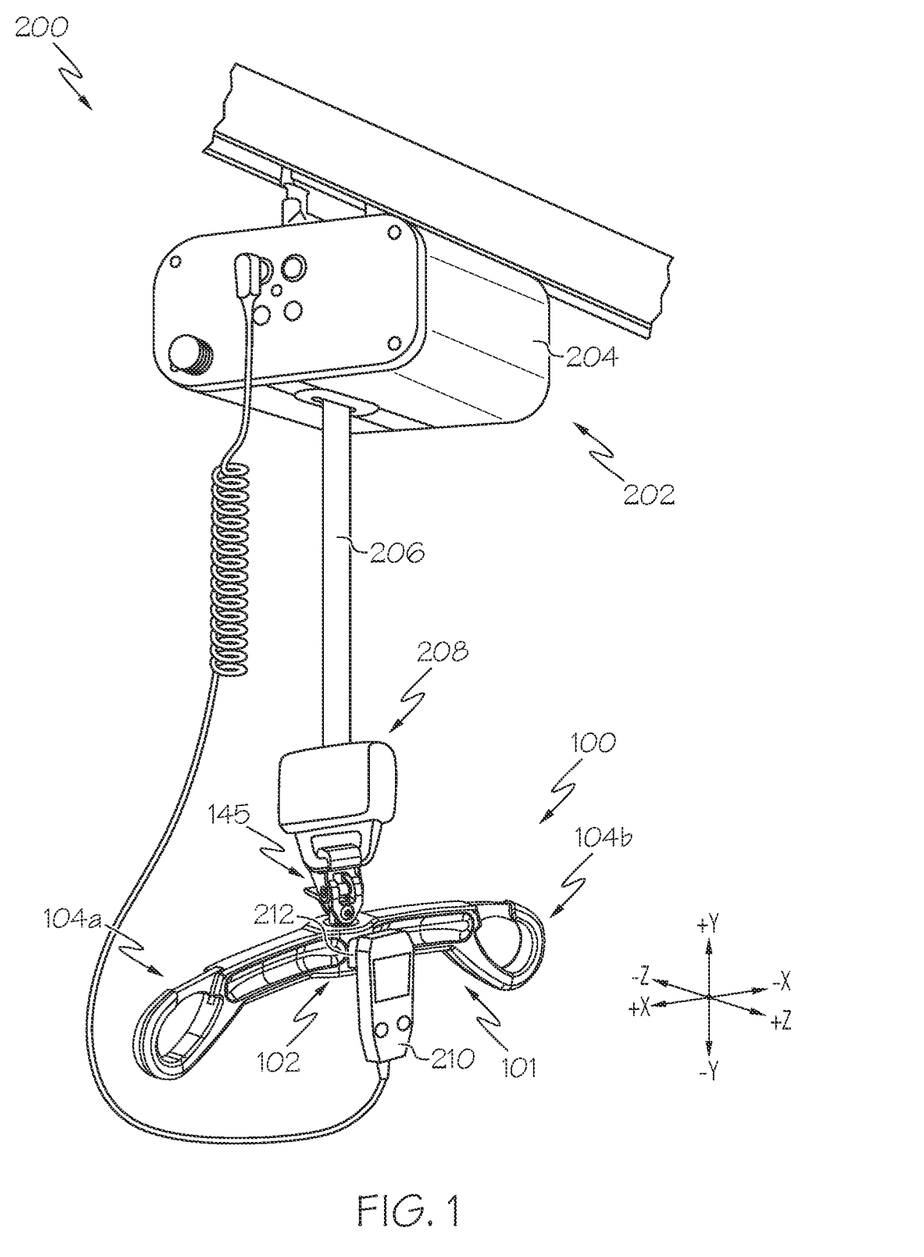
FIG. 1 schematically depicts a lifting assembly including a sling bar, according to one or more embodiments shown and described herein.

FIG. 1 schematically depicts a perspective view of an illustrative lift assembly 200 including an illustrative sling bar 100 coupled to a lifting device 202, according to various aspects of the present disclosure. The lifting device 202 (e.g., an overhead lift) may include a lift mechanism 204 (such as a motorized lift unit) coupled to a lift strap 206. A sling bar attachment mechanism 208 may be coupled to the lift strap 206. The sling bar 100 may be coupled to the sling bar attachment mechanism 208 via the lift hook 145 that is coupled to a central hub 102 via a mounting linkage 140, as will be described in greater detail herein. The lift mechanism 204 may wind down (e.g., pay out) the lift strap 206 to lower the sling bar 100 (e.g., and a subject sling or other subject support device) and/or wind up (e.g., take up) the lift strap 206 to raise the sling bar 100 (e.g., and the subject sling or other subject support device). A hand control device 210 may be communicatively coupled (e.g., wired or wirelessly) to the lift mechanism 204 to control operation of the lift mechanism 204. For example, the hand control device 210 may include any number of buttons, toggles, switches, touch screen interfaces, or the like to input operational instructions to operate the lift mechanism 204 as desired and/or display information regarding the lift mechanism 204, the lift strap 206, the sling bar 100, and/or the like. The hand control device 210 may include a mounting block 212, such as a magnetic mounting block, to removably couple the hand control device 210 to the sling bar 100, as described herein.

Figure 2:
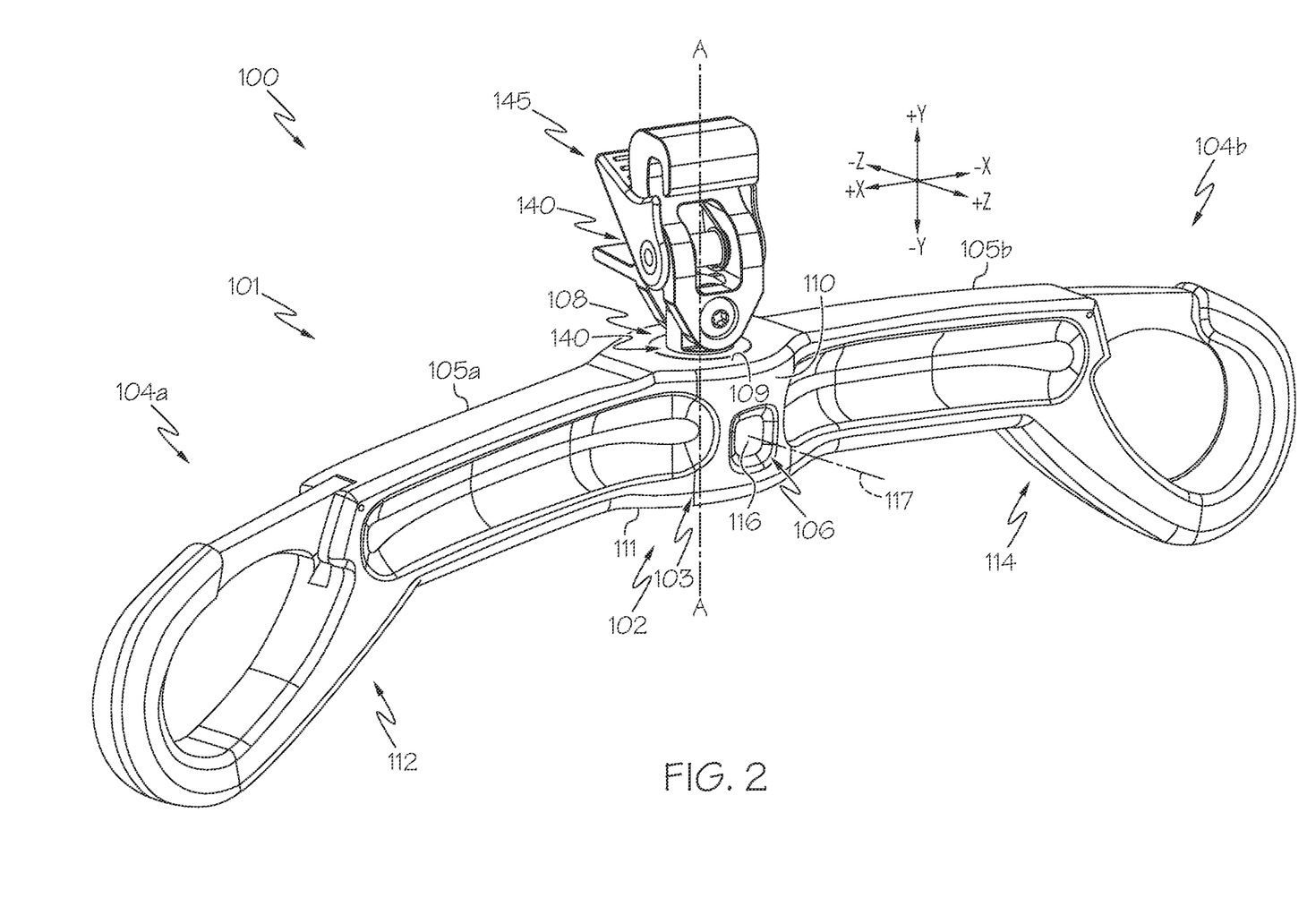
FIG. 2 schematically depicts a perspective view of the sling bar of FIG. 1, according to one or more embodiments shown and described herein.

FIG. 2 depicts a perspective view of an illustrative sling bar 100. A sling bar generally refers to any device that includes one or more hooks to which a sling or other subject support device may be attached. For example, a sling bar 100 may generally include frame 101 defining a central hub 102, a first hook 104a, and a second hook 104b.

In various embodiments, the central hub 102 may be defined, concentrically, about a first axis (e.g., axis A-A as depicted in FIG. 2) such that a center of gravity of the sling bar 100 is located at the central hub 102. As will be described in greater detail herein, the central hub 102 may include a wall 103 that defines an internal hollow region 108 (not depicted in the assembled embodiment of FIG. 2) and an external hub surface 110. Each of the wall 103, internal hollow region 108, and the external hub surface 110 may be generally cylindrically shaped and extend about the first axis (e.g., axis A-A) between a first horizontal surface 109 (e.g., in the +Y direction of the coordinate axes of FIG. 2) and a second horizontal surface 111 (e.g., in the −Y direction of the coordinate axes of FIG. 2).

The central hub 102 of the sling bar 100 may define one or more niches 106 or recesses formed within the wall 103 of the central hub 102. As illustrated, the one or more niches 106 may be recessed relative to the external hub surface 110 of the central hub 102. Briefly referring also to FIGS. 1 and 3, the one or more niches 106 may be shaped, sized, and/or configured to receive a mounting block 212 of a hand control device 210 such that the hand control device 210 may be mounted to the sling bar 100 at the one or more niches 106. To provide various mounting positions, the one or more niches 106 may include a plurality of niches (e.g., two or more) arranged circumferentially around the internal hollow region 108 (and/or the first axis). In some embodiments, the one or more niches 106 may be arranged along a centerline of the frame 101 in the longitudinal direction (e.g., the +/−X directions of the coordinate axes of FIG. 2). By arranging the one or more niches 106 along a centerline of the frame 101 in the longitudinal direction (+/−X), the center of gravity of the sling bar 100 may remain substantially centered such that mounting of the hand control device 210 does not cause the first hook 104a or the second hook 104b to rotate, raise (e.g., move in the +Y direction of the coordinate axes of FIG. 1), or lower (e.g., move in the −Y direction of the coordinate axes of FIG. 1) from the horizontal position. It is noted that in some embodiments, the one or more niches 106 may instead be windows or ports, which open into the internal hollow region 108 of the central hub 102.

In some embodiments, the one or more niches 106 may be shaped to inhibit rotation of the hand control device 210 about an axis 117 extending perpendicularly relative to a back wall 116 of the niche 106 when the hand control device 210 is mounted to the niche 106. By preventing rotation of the hand control device 210 within the niche 106, the hand control device 210 may retain its positioning relative to the sling bar 100 as a sling or other support device is mounted to the sling bar 100. For example, the one or more recessed niches 106 may have a polygonal shape or non-polygonal (e.g., oval, egg-shaped, or the like) which substantially corresponds to a shape of a mounting block 212 of the hand control device 210, such that when received within a niche 106, the niche 106 contacts edges of the mounting block 212 to inhibit rotation of the mounting block 212. However, it is contemplated that in some embodiments, rotation of the hand control device 210 about an axis extending perpendicular to a the back wall 116 of the niche 106 may be desirable. For example, the one or more niches 106 may be round or sized such that the hand control device 210 may freely rotate about the axis extending perpendicular to the back wall 116 of the niche 106. In such embodiments, the hand control device 210 may be pulled by gravity so as to remain parallel to the vertical axis (+/−Y axis of the depicted coordinate axes).

Figure 3:
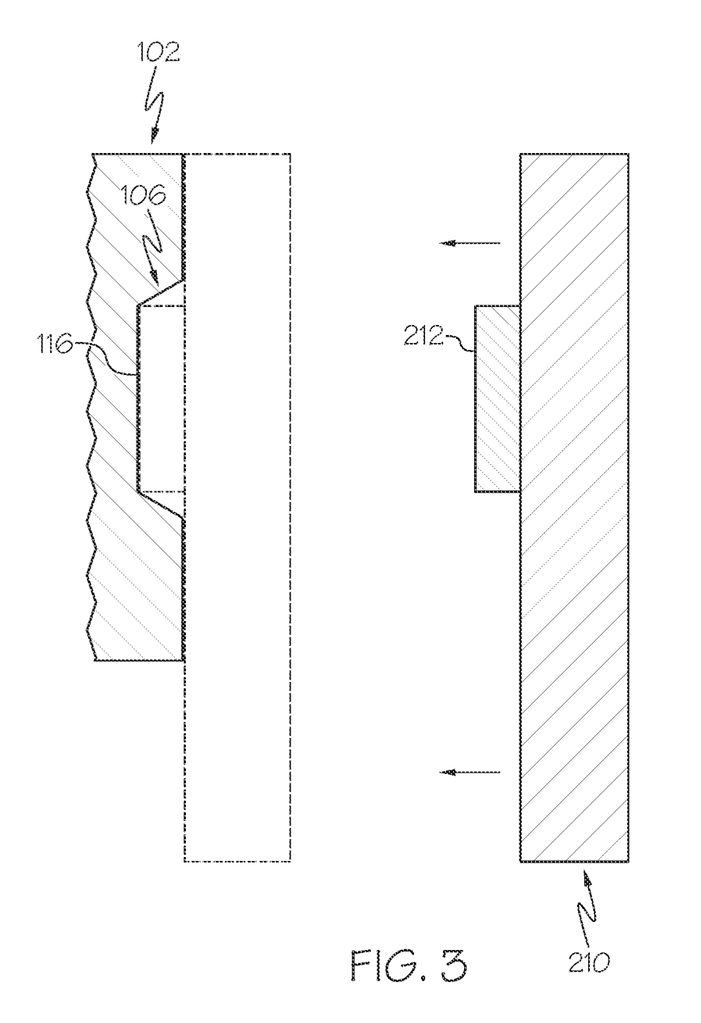
FIG. 3 schematically depicts engagement of a hand control device into a niche of the sling bar of FIG. 2, according to one or more embodiments shown and described herein.

With reference to FIG. 3, the hand control device 210 is schematically depicted moving from an un-mounted position to a mounted position engaged with a niche 106. In the illustrated embodiment, the mounting block 212 may extend into the niche 106 to directly engage a back wall 116 of the niche 106. The mounting block 212 of the hand control device 210 may include a magnet (for example, a permanent magnet, temporary magnet, electromagnet, or any combination thereof). A ferromagnetic material may be positioned within the central hub 102, such that the mounting block 212 is magnetically attracted to the ferromagnetic material through the back wall 116 of the niche 106 and is maintained in place by the magnetic attraction between the mounting block 212 and the ferromagnetic material within the central hub 102. As used herein, "ferromagnetic" refers to any material or substance which is capable of being in the presence of a magnetic field or is magnetized. Ferromagnetic materials may include, for example, iron, nickel, cobalt, steel, stainless steel, rare earth metals, alloys thereof, or any combination thereof. It is contemplated that either the mounting block 212 or the material positioned within the central hub 102 may be magnetized, thereby attracting the other of the mounting block 212 or the ferromagnetic material positioned within the central hub 102. In some embodiments, it is contemplated that both the mounting block 212 and the material positioned within the central hub 102 may be magnetized, and their poles may be arranged to be attracted to another when the mounting block 212 is positioned within the niche 106.

Referring again to FIG. 2, as noted above, the sling bar 100 may include the first hook 104a and the second hook 104b. Illustrative embodiments of the first hook 104a and the second hook 104b are described in U.S. Provisional Patent Application No. 63/058,072, entitled "Sling Bars, Methods for Attaching a Subject Sling to Sling Bars, and Lift Systems Using Sling Bars," filed Jul. 29, 2020, which is hereby incorporated by reference in its entirety. The first hook 104a and the second hook 104b may be configured to have a subject sling, repositioning sheet, or similar subject support mounted thereto. Accordingly, the sling bar 100 may be used in conjunction with, for example, a lifting device 202 (FIG. 2) to support, transport, reposition, and/or move a subject.

Still referring to FIG. 2, the first hook 104a may extend from the central hub 102 via a first bar portion 105a and the second hook 104b may extend from central hub 102 via a second bar portion 105b. The first and second bar portions 105a, 105b form portions of the frame 101. The first bar portion 105a may generally extend from the external hub surface 110 of the central hub 102 in a first longitudinal direction (e.g., in the +X direction of the coordinate axes of FIG. 1) toward a first end 112, and the second bar portion 105b may generally extend from the external hub surface 110 of the central hub 102 in a second longitudinal direction (e.g., in the −X direction of the coordinate axes of FIG. 1) toward a second end 114. It is noted that there may be a greater or fewer number of hooks and/or bar portions extending from the central hub 102 without departing from the scope of the present disclosure.

Referring still to FIG. 2, the first hook 104a may be positioned at or near the first end 112, in the first longitudinal direction (e.g., in the +X direction of the coordinate axes of FIG. 2), of the first bar portion 105a and the second hook 104b may be positioned at or near the second end 114, in the second longitudinal direction (e.g., in the −X direction of the coordinate axes of FIG. 2), of the second bar portion 105b. Each of the first hook 104a and the second hook 104b may selectively couple a subject sling, or other subject supporting device, to the sling bar 100. In particular, each of the first hook 104a and the second hook 104b may be sized and/or dimensioned to couple to one or more than one sling loop of one or more than one subject sling.

Still referring to FIG. 2, a lift hook 145 may be coupled to the sling bar 100 at or near the first horizontal surface 109, via a mounting linkage 140. The lift hook 145 may aid in mounting the sling bar 100 to a lift, such as the lift mechanism 204 illustrated in FIG. 1. For example, the lift hook 145 may be coupled to the sling bar 100 via a mounting linkage 140 positioned within the central hub 102, as will be described in greater detail below.

In light of FIG. 2, various components of the sling bar 100 including the central hub 102, the first bar portion 105a, the second bar portion 105b, the first hook 104a, the second hook 104b, the mounting linkage 140, and/or the lift hook 145, may be defined by a material or materials capable of withstanding anticipated static and/or dynamic forces on the sling bar 100 without fatigue and/or failure of such various components. According to various aspects, each component may be dimensioned to withstand, alone and/or in combination with other components, the anticipated static and/or dynamic forces. In some aspects, the various components of the sling bar 100 including the central hub 102, the first bar portion 105a, the second bar portion 105b, the first hook 104a, the second hook 104b, the mounting linkage 140, and/or the lift hook 145, may be defined by a cast aluminum, steel, a metal alloy, and/or the like. In embodiments, each of the central hub 102, the first bar portion 105a, the second bar portion 105b, the first hook 104a, and/or the second hook 104b may be integrally formed with one another (e.g., integrally formed via casting), or formed separately from one another and coupled together via any coupling technique (e.g., welding, fastening, or the like). In some embodiments, at least the central hub 102 may be formed of a material, which is non-magnetic, such that the mounting block 212 of the hand control device 210 is not attracted to the central hub 102.

Figure 4:
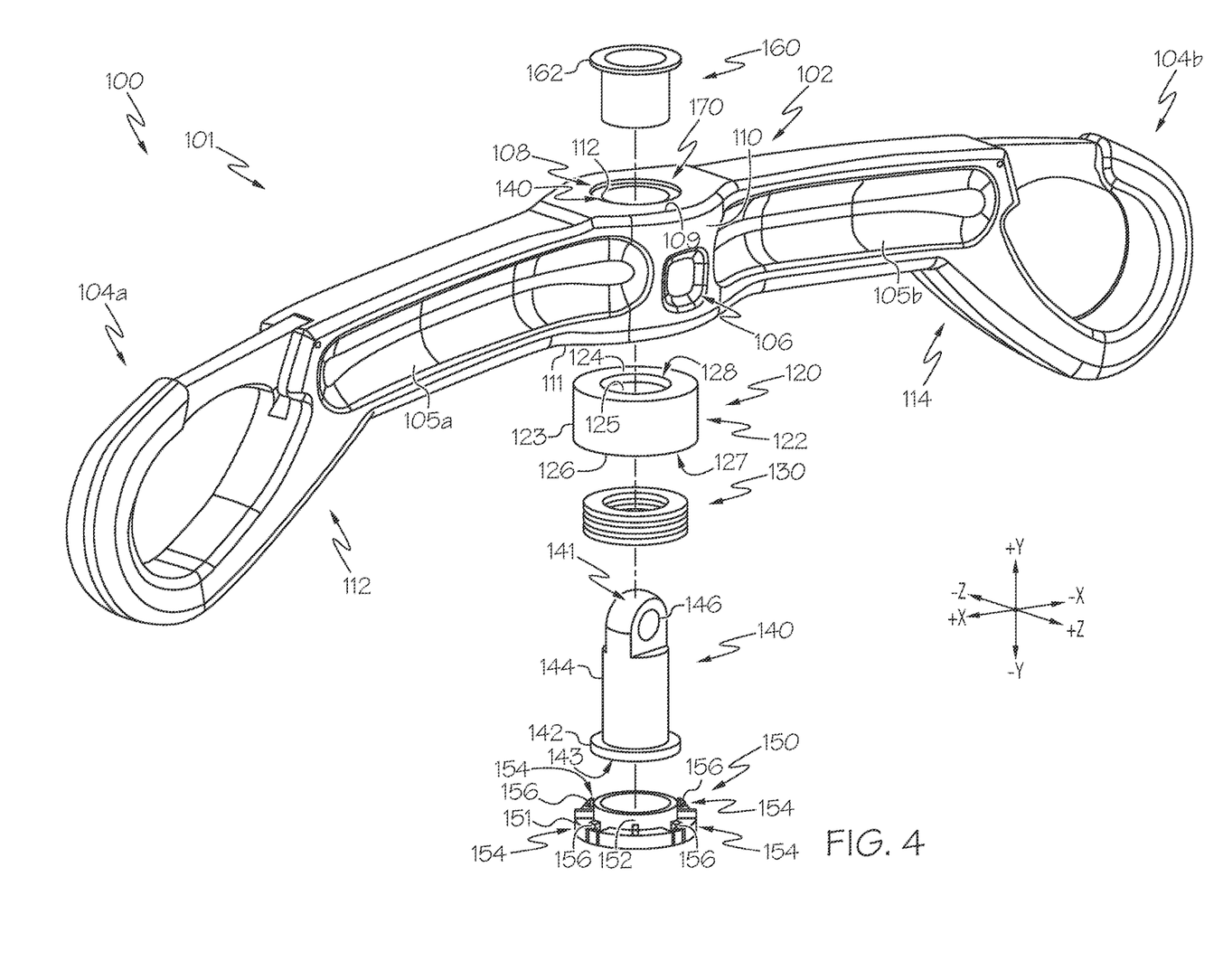
FIG. 4 schematically depicts an exploded view of the sling bar of FIG. 2, according to one or more embodiments shown and described herein.

FIG. 4 illustrates an exploded view of the sling bar 100 depicted in FIG. 2. From this perspective, the various contents which may be housed within the internal hollow region 108 of the central hub 102, additional detail of which may be seen in FIG. 5. For example, housed within the internal hollow region 108 of the central hub 102 may be a ferromagnetic insert 120, one or more bearings 130, a mounting linkage 140, a cap 150, and a bushing 160. It is noted that a greater or fewer number of internal components may be included without departing from the scope of the present disclosure.

As illustrated in FIG. 4, the ferromagnetic insert 120 may generally have a hollow body 122 that defines an upper surface 124, a lower surface 126 opposite the upper surface 124, and a sidewall 123 extending between the upper surface 124 and the lower surface 126. The hollow body 122 may generally define a cavity 128 that extends through the hollow body 122 from the lower surface 126 through the upper surface 124. For example, a first opening 125 may be formed in the upper surface 124 and a second opening 127 (shown in FIG. 5) may be formed in the lower surface 126 opposite from the first opening 125. Each of the first opening 125 and the second opening 127 provide access to the cavity 128. In embodiments, the first opening 125 may be narrower than the second opening 127 (illustrated in FIG. 5). It is noted that though the first opening 125 and the second opening 127 are depicted as having a circular shape, other shapes are contemplated and possible (for example, square, rectangular, oval, or any polygonal or non-polygonal shape). As will also be described in greater detail below, the hollow body 122 of the ferromagnetic insert 120 may be sized and shaped to be received by the internal hollow region 108 of the central hub 102. As will also be described in further detail below, the cavity 128 of the ferromagnetic insert 120 may be configured to receive the mounting linkage 140 and the one or more bearings 130, thereby increasing the compactness of the assembly.

Figure 5:
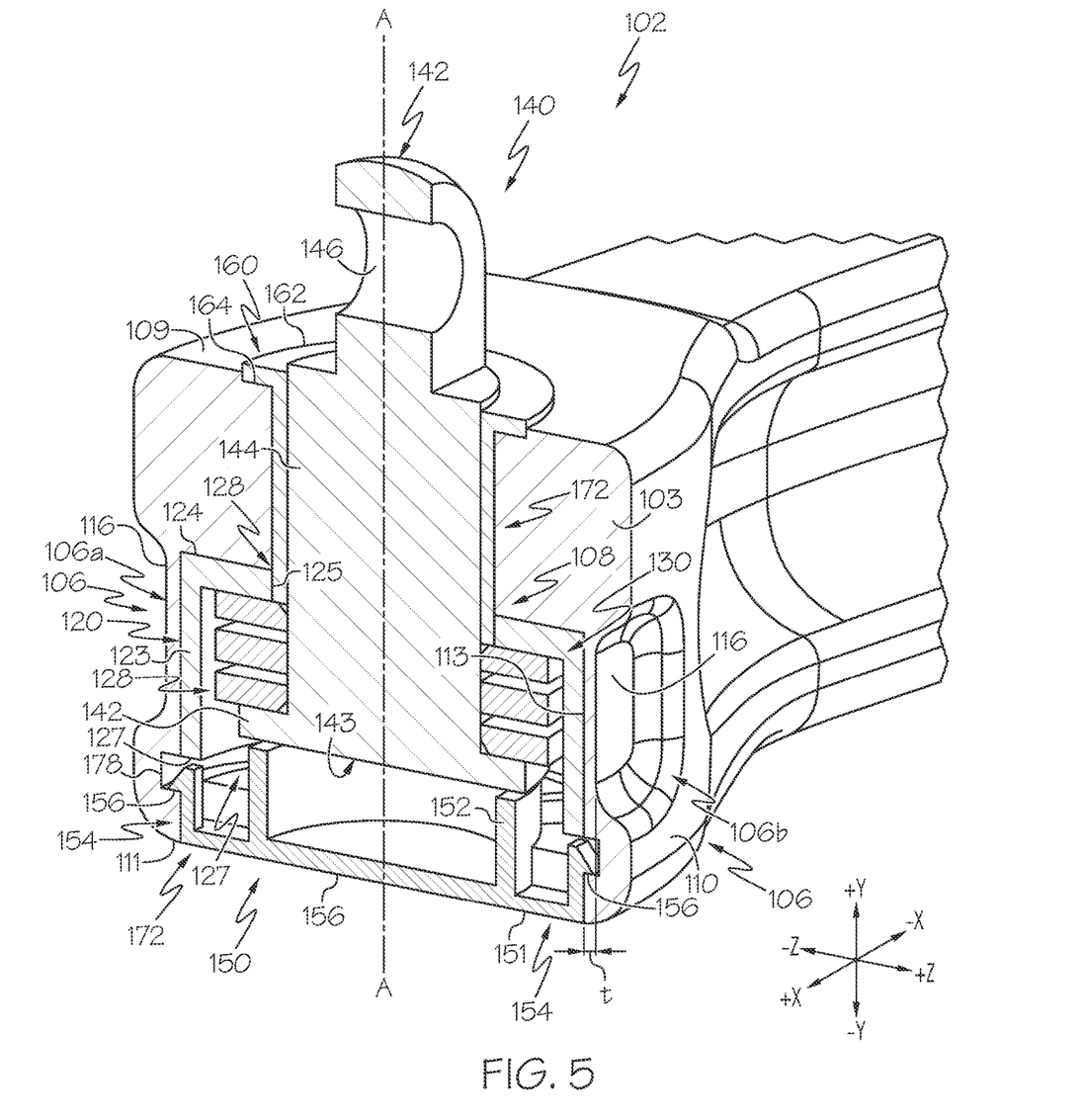
FIG. 5 schematically depicts a cross-sectional view of the sling bar of FIG. 2, according to one or more embodiments shown and described herein.

Still referring to FIG. 4, the one or more bearings 130 may be sized and shaped to be positioned within the cavity 128 of the ferromagnetic insert 120 (shown in FIG. 5). As will be described in more detail herein, the one or more bearings 130 may support rotational motion of the of the mounting linkage 140, such that the mounting linkage 140 may rotate about the central axis A-A, depicted in FIG. 2. For example, the one or more bearings 130 may include a plurality of ball bearings (not shown), which may support smooth rotation of the mounting linkage 140 relative to the ferromagnetic insert 120 or other components of the sling bar 100. In various embodiments, the one or more bearings 130 may include any type of bearing such as a roller bearing, a thrust bearing, or the like.

Still referring to FIG. 4, the mounting linkage 140 is sized, shaped, and arranged to mount the sling bar 100 to the lift hook 145, illustrated in FIGS. 1 and 2. Generally, the mounting linkage 140 may have an elongate body 144 having a diameter and defining a first end 141 opposite a second end 143. As will be described in more detail below, the diameter of the elongate body 144 may be sized so as to be able to extend through a first opening 170 formed in the first horizontal surface 109 of the central hub 102 and the first opening 125 of the ferromagnetic insert 120. A hole 146 may be formed within the elongate body 144 of the mounting linkage 140 proximate to the first end 141 of the elongate body 144. The hole 146 may facilitate mounting the lift hook 145 to the mounting linkage 140, as illustrated in FIG. 1. For example, a pin, bolt, or other fastener of the lift hook 145 may be positioned within the hole 146 to couple the mounting linkage 140 to the lift hook 145. The mounting linkage 140 may further include a retention flange 142 formed at the second end 143 of the elongate body 144 and may extend radially about an axis defined by the elongate body 144. The retention flange 142 may have an increased diameter relative to the diameter of the elongate body 144 and may have a larger diameter than the first opening 170 formed in the first surface 109 of the central hub 102 and the first opening 125 of the ferromagnetic insert 120.

Still referring to FIG. 4, the cap 150 may be sized and shaped to be coupled to the central hub 102 to enclose and/or hold components within the internal hollow region 108 of the central hub 102. The cap 150 may define a base plate 151 and a positioning core 152 extending from the base plate 151. The cap 150 may be made from any material suitable to engage the central hub 102 and support rotational motion of the mounting linkage 140. For example, the cap 150 may be formed of a polymer which provides a low friction surface (for example phenolics, acetals, Teflon (PTFE), ultra-high molecular weight polyethylene (UHMWPE), and nylon) against which the mounting linkage 140 may rotate.

In some embodiments, such as depicted in FIG. 4, the cap 150 may define one or more retention legs 154. The one or more retention legs 154 may be extend from the base plate 151 and may be able to flex relative to the base plate 151. One or more hooking portions 156 may extend from an end of each of the one or more retention legs 154. As will be described below, when assembly, the one or more retention legs 154 may flex and engage a retention ring 178 (depicted in FIG. 5) formed within the wall 103 of the central hub 102 within the internal hollow region 108 with the hooking portion 156. The one or more retention legs 154 may include a single retention leg that extends circumferentially from the base plate 151 around the positioning core 152. In other embodiments, the one or more retention legs 154 may include a plurality of retention legs 154, such as illustrated in FIG. 4, circumferentially spaced from one another around the positioning core 152. For example, the one or more retention legs 154 may include two or more retention legs, three or more retention legs, four or more retention legs, or the like. The multiple retention legs 154 may be equally spaced around an axis extending through the central hub 102. In other embodiments, the multiple retention legs 154 may be unevenly spaced around the axis extending through the central hub 102.

Still referring to FIG. 4, and as noted above, the sling bar 100 may further include a bushing 160 that facilitates rotation of the mounting linkage 140. For example, the bushing 160 may be a polymer bushing, which provides a low friction surface against which the mounting linkage 140 may rotate. Example materials may include, but are not limited to, phenolics, acetals, Teflon (PTFE), ultra-high molecular weight polyethylene (UHMWPE), and nylon. In embodiments, and as will be described below, the bushing 160 is configured to be inserted between an inner surface 113 of central hub 102 at the first opening 170 and the mounting linkage 140. To hold the bushing 160 in place, formed along one end of the bushing 160 may be a lip 162, configured to fit with a lip recess 164 formed in the first surface 109 of the central hub 102 around the first opening 170.

Referring now to FIG. 5, a cross-section of the central hub 102 of the assembled sling bar 100 illustrated in FIG. 2 taken along the central axis A-A through the Z/Y plane of the coordinate axes. From such perspective, various orientations of the various components relative to one another are depicted. In particular, FIG. 5 illustrates exemplary internal contours of the internal hollow region 108 of the central hub 102. As depicted, the first opening 170 may be formed in the first horizontal surface 109 of the central hub 102, which may provide access to the internal hollow region 108. A second opening 172 may be formed within the second horizontal surface 111 opposite to the first opening 170. The openings 170, 172 may provide access for insertion and/or removable of components into and out of the internal hollow region 108. The internal hollow region 108 may accordingly extend between the first opening 170 and the second opening 172. The first opening 170 may have a diameter that is smaller than a diameter of the second opening 172, and may act as a stop to prevent components (for example, the ferromagnetic insert 120, the bearing 130, and/or the mounting linkage 140) within the internal hollow region 108 from being pulled through the first opening 170.

In some embodiments, and as noted above, a retention ring 178 may be formed within the wall 103 of the central hub 102 and may be recessed from the inner surface 113 of the central hub 102. The retention ring 178 may circumscribe the internal diameter of the wall 103, or only a portion thereof. The retention ring 178 may be formed adjacent to the second opening 172 such that it is positioned to be engaged by the one or more retention legs 154 of the cap 150.

Still referring to FIG. 5, and as noted herein, the one or more niches 106 may include a plurality of niches 106. For example, the one or more niches 106 may include a first niche 106a and a second niche 106b opposite the first niche 106a, though a greater number of niches 106 are contemplated and possible. As noted above, the one or more niches 106 may be outward facing and recessed into the wall 103 of the central hub 102. Accordingly, in some embodiments, the wall 103 may have a reduced thickness t at the back wall 116 of the one or more niches 106 relative to other positions along the wall 103, such as those spaced from the one or more niches 106. The reduced thickness t of the wall 103 of the central hub 102 may allow for stronger attraction between the mounting block 212 of the hand control device 210, for example where the mounting block 212 is magnetic, and the ferromagnetic insert 120 positioned within the internal hollow region 108.

Still referring to FIG. 5, when assembled within the internal hollow region 108, the ferromagnetic insert 120 may sit within the internal hollow region 108 so as to be in contact with the wall 103 of the central hub 102 and adjacent to the one or more niches 106. As noted above, the reduced thickness t of the wall 103 of the central hub 102 at the one or more niches 106 may allow for stronger attraction between the mounting block 212 of the hand control device 210 and the ferromagnetic insert 120 positioned within the internal hollow region 108. For example, the reduced thickness t of the wall 103, may provide reduced interference between the magnetic attraction between the mounting block 212 of the hand control device 210 and the ferromagnetic insert 120, than at other positions where the wall 103 has a greater thickness. In some embodiments, the central hub 102 and/or portions thereof may be formed of non-magnetic materials such as, but not limited to aluminum, copper, lead, tin, titanium, zinc, brass, bronze, gold silver, or the like.

The shape of the ferromagnetic insert 120 may substantially correspond to a shape of the internal hollow region 108, such that the ferromagnetic insert 120 is in contact with an inner surface 113 of the central hub 102 along the upper surface 124 and the sidewall 123. The ferromagnetic insert 120 may be arranged entirely within the internal hollow region 108, such that no portion of the ferromagnetic insert 120 extends outside of the internal hollow region 108. However, it is contemplated that in some embodiments, one or more portions of the ferromagnetic insert 120 may extend outside of the confines of the internal hollow region 108. In yet further embodiments, it is contemplated that the ferromagnetic insert 120 may be accessible through the one or more niches 106 such as where the one or more niches 106 define a port or window into the internal hollow region 108.

Still referring to FIG. 5, when assembled, the mounting linkage 140 may be inserted into the internal hollow region 108 of the central hub 102 such that the mounting linkage 140 extends through the first opening 125 of the ferromagnetic insert 120 and extends in the +Y direction of the coordinate axes of FIG. 5 a distance beyond the first surface 109 of the central hub 102, such that the first end 141 including the hole 146 is positioned externally of the central hub 102 when the mounting linkage 140 is assembled to the central hub 102. When assembled, the retention flange 142 may be positioned within the ferromagnetic insert 120 and the upper surface 124 of the ferromagnetic insert 120 may restrict motion of the mounting linkage 140 through the ferromagnetic insert 120 and the internal hollow region 108.

As described above, when assembled within the lift assembly 200 as illustrated in FIG. 2, the mounting linkage 140 may allow the frame 101 of the sling bar 100 to pivot around the mounting linkage 140. To facilitate smooth rotation of the mounting linkage 140, the one or more bearings 130 may be positioned within the ferromagnetic insert 120, between the upper surface 124 of the ferromagnetic insert 120 and the retention flange 142 of the mounting linkage 140, so as to provide reduced friction or resistance to rotation. Accordingly, the bearing 130 may be sandwiched along the +/−Y axis of the coordinate axes depicted in FIG. 5, between the upper surface 124 of the ferromagnetic insert 120 and the retention flange 142 of the mounting linkage 140.

Still referring to FIG. 5 and as noted above, the cap 150 may be coupled to the central hub 102 to enclose and/or hold components within the hollow portion of the central hub 102. When engaged with the central hub 102, the positioning core 152 may extend to into the internal hollow region 108 to contact the retention flange 142 of the mounting linkage 140. This may cause the bearing 130, the retention flange 142, and the ferromagnetic insert 120 to be sandwiched between the positioning core 152 and first surface 109 of the central hub 102. The cap 150 may be made from any material suitable to engage the central hub 102 and support rotational motion of the mounting linkage 140. For example, the cap 150 may be formed of a polymer, such as noted hereinabove, which provides a low friction surface against which the mounting linkage 140 may rotate.

In some embodiments, the cap 150 may engage the central hub 102, for example, via a press fit between central hub 102 and the base plate 151. In some embodiments, such as depicted in FIG. 5, the one or more retention legs 154 flex and snap the hooking portion 156 into the retention ring 178, thereby securing the cap 150 to the central hub 102.

Still referring to FIG. 5, the bushing 160 may be inserted into the first opening 170 so as to circumscribe the mounting linkage 140. In embodiments, when assembled the lip 162 may sit within the lip recess 164. As noted above, the bushing 160 may be a polymer bushing, which provides a low friction surface against which the mounting linkage 140 may rotate. The bushing 160 may interact with the mounting linkage 140 maintain a centered position of the mounting linkage 160 within the center hub 102 and substantially prevent wobbling or off-axis movement of the mounting linkage 160 within the center hub 102. In some embodiments, the bushing 160 may additionally provide fluid resistance, for preventing fluid entry into the internal hollow region 108 or egress of fluid (e.g., lubricating fluid for supporting pivoting motion of the mounting linkage) from the internal hollow region 108 of the central hub 102 through the outlet 172.

In some embodiments, sling bar 100 may be provided as a kit of parts, which may include instructions for, for example, assembling the sling bar 100, assembling the sling bar 100 to the lift mechanism 204, and/or care instructions for cleaning and/or sterilization. In some embodiments, the instructions may be available to user via a digital or internet based platform.

Figure 6:
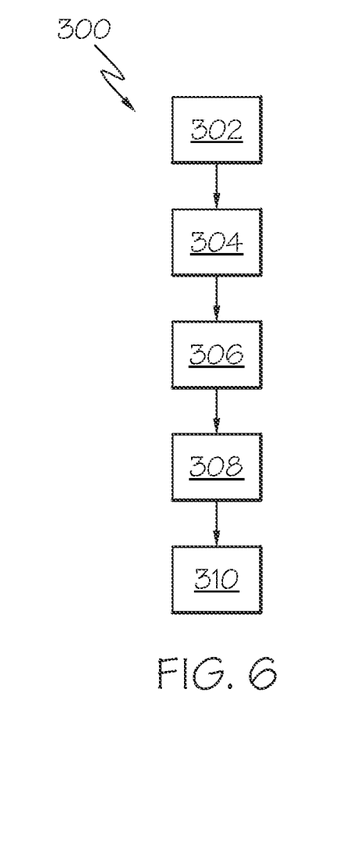
FIG. 6 depicts a flow chart illustrating a method of assembling a sling bar, according to one or more embodiments shown and described herein.

FIG. 6 depicts a method 300 of assembling the sling bar 100 according to one or more embodiments shown and described herein. The method 300 includes a plurality of steps depicted as blocks 302-310. Such steps may be performed in any order and may include a greater or fewer number of steps without departing from the scope of the present disclosure. For example, at block 302, the method 300 includes providing the frame 101 of sling bar 100 such that the frame 101 defines the central hub 102, the first hook 104a, and the second hook 104b. In some embodiments, providing the frame 101 of the sling bar 100 may include forming the frame 101 of the sling bar 100. For example, and as noted above, the frame 101 may be integrally formed via casting or various components of the frame 101 may be coupled to one another via welding, fasteners, brazing, or the like. In embodiments, forming the central hub 102 may include forming the wall 103 defining the internal hollow region 108 and an external hub surface 110. As noted above, the internal hollow region 108 may be shaped and sized to receive a ferromagnetic insert 120 therein. Forming the central hub 102 may further include forming the one or more niches 106 within the wall 103. As described above, the one or more niches 106 may be recessed into the wall 103 from the external hub surface 110. Additionally, and as described above, the one or more niches 106 arranged radially around the internal hollow region 108 and sized and shaped to receive a hand control device 210.

Block 304 of the method 300 may include inserting the ferromagnetic insert 120 within the hollow portion of the central hub 102, such that the one or more niches 106 are positioned adjacent to the ferromagnetic insert 120. At block 306, the bearing 130 may be placed within the hollow portion of the central hub 102 and/or within the ferromagnetic insert 120 as illustrated in FIG. 5. At block 306, the method 300 includes inserting the mounting linkage 140 within the cavity 128 of the ferromagnetic insert 120 such that the mounting linkage 140 extends externally from the central hub 102. For example, the mounting linkage 140 may be inserted through the ferromagnetic insert 120 and/or the bearing 130 within the internal hollow region 108 and extend through first opening 170 formed in the first surface 109 of the central hub 102. The mounting linkage 140 may be inserted through the ferromagnetic insert 120 unit the retention flange 142 of the mounting linkage 140 contacts the one or more bearings 130 positioned within the ferromagnetic insert 120. At block 308, the bushing 160 may be positioned between the wall 103 of the central hub 102 and the elongate body 144 of the mounting linkage 140. When mounted, the lip 162 of the bushing 160 may be positioned within the lip recess 164, described above. At block 310, the cap 150 may be coupled to the central hub 102 to thereby enclose the ferromagnetic insert 120 one/or other components within the internal hollow region 108 of the central hub 102. For example, the cap 150 may be positioned within the second opening 172 of the central hub 102 and may be coupled to the central hub 102 via a press-fit within the internal hollow region 108. In some embodiments, and as noted above, the cap 150 may include one or more retention legs 154 that may flex during insertion and snap into the retention ring 178 formed within the internal hollow region 108.

It should now be understood that embodiments described herein include sling bars include a frame defining a central hub, a first hook extending from the central hub and a second hook extending from the central hub. The central hub generally includes a wall defining an internal hollow region and an external hub surface. The internal hollow region is shaped and sized to receive a ferromagnetic insert therein. One or more niches are formed within the wall and recessed into the wall from the external hub surface. The one or more niches are arranged radially around the internal hollow region and sized and shaped to receive a hand control device. For example, the hand control device may include a mount, such as a magnetic mounting block, which is configured to interface with a niche of the one or more niches, such that the hand control device becomes magnetically coupled to the ferromagnetic insert positioned within the internal hollow region. Accordingly, when not held in the hand of a user, the hand control device may be mounted to the sling bar such that it secured out of the way but remains accessible to the user and/or operator. Because the hand control device may be removably mounted to the center of the sling bar, the weight of the hand control device may not cause the sling bar to tilt one way or another as the center of gravity of the sling bar with the hand control device mounted thereto will remain concentrated at the central hub. Additionally, in some embodiments a hand control device may operate wirelessly or otherwise untethered via a physical medium to the lift unit. In such embodiments, the one or more niches may aid in preventing the hand control device from being lost as it will be convenient to place the hand control device back on the central hub versus another location where it may be misplaced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sling bar, comprising:
   a frame defining a central hub, a first hook extending from the central hub, and a second hook extending from the central hub, the central hub comprising:
   a wall defining an internal hollow region and an external hub surface;
   one or more niches formed within the wall and recessed into the wall from the external hub surface, the one or more niches arranged radially around the internal hollow region and sized and shaped to receive a hand control device for operating a lifting device; and
   a ferromagnetic insert positioned within the internal hollow region and configured to magnetically mount the hand control device at the one or more niches.

2. The sling bar of claim 1, wherein:
   the ferromagnetic insert defines a cavity; and
   a mounting linkage is arranged to mount the sling bar to the lifting device, wherein the mounting linkage is positioned within the internal hollow region of the ferromagnetic insert and extends externally from the central hub.

3. The sling bar of claim 2, wherein the ferromagnetic insert comprises a first opening into the cavity and a second opening into the cavity opposite the first opening, wherein the second opening has a larger diameter than the first opening.

4. The sling bar of claim 3, wherein the mounting linkage comprises a retention flange comprising a larger diameter than the first opening of the ferromagnetic insert.

5. The sling bar of claim 2, further comprising a cap coupled to the central hub and enclosing the ferromagnetic insert within the internal hollow region of the central hub.

6. The sling bar of claim 5, wherein the cap comprises:
a base plate; and
a positioning core extending from the base plate, wherein the positioning core is positioned within the internal hollow region of the central hub and contacts the mounting linkage.

7. The sling bar of claim 6, wherein the base plate is press-fit into the internal hollow region of the central hub.

8. The sling bar of claim 6, wherein the cap further comprises one or more retention legs extending from the base plate.

9. The sling bar of claim 8, wherein the central hub comprises a retention ring recessed into the wall of the central hub within the internal hollow region, and one or more hooking portions of the one or more retention legs are positioned within the retention ring thereby securing the cap to the central hub within the internal hollow region.

10. The sling bar of claim 1, wherein the one or more niches comprise a polygonal shape that mates with a magnetic mounting block of the hand control device.

11. The sling bar of claim 1, wherein the one or more niches comprise a plurality of niches positioned circumferentially around an axis of the central hub.

12. The sling bar of claim 2, wherein the ferromagnetic insert is coincident with the mounting linkage.

13. A kit of parts, comprising
a sling bar comprising:
a frame defining a central hub, a first hook extending from the central hub, and a second hook extending from the central hub, the central hub comprising:
a wall defining an internal hollow region and an external hub surface; and
one or more niches formed within the wall and recessed into the wall from the external hub surface, the one or more niches arranged radially around the internal hollow region and sized and shaped to receive a hand control device for operating a lifting device;
a ferromagnetic insert positioned within the internal hollow region and configured to magnetically mount the hand control device at the one or more niches; and
instructions for at least one of assembling the sling bar, assembling the sling bar to a lift mechanism, or care instructions for cleaning or sterilization of the sling bar.

14. The kit of claim 13, wherein the instructions comprises instructions of assembly the sling bar to the lift mechanism and/or cleaning or sterilizing the sling bar.

15. A lift assembly comprising:
a lifting device comprising a hand control device for controlling the lifting device; and
a sling bar comprising:
a frame defining a central hub, a first hook extending from the central hub, and a second hook extending from the central hub, the central hub comprising:
a wall defining an internal hollow region and an external hub surface;
a ferromagnetic insert positioned within the internal hollow region and configured to magnetically mount the hand control device at the one or more niches; and
one or more niches formed within the wall and recessed into the wall from the external hub surface, the one or more niches arranged radially around the internal hollow region and sized and shaped to receive the hand control device.

16. The lift assembly of claim 15, wherein the hand control device comprises a mounting block sized and shaped to mate with the one or more niches.

17. The lift assembly of claim 16, wherein the mounting block of the hand control device is a magnet.

18. The lift assembly of claim 16, wherein a shape of one or more niches substantially corresponds to a shape of the mounting block of the hand control device.

19. The lift assembly of claim 15, wherein the sling bar further comprises:
the ferromagnetic insert positioned within the internal hollow region, the ferromagnetic insert defining a cavity; and
a mounting linkage that mounts the sling bar to the lifting device, wherein the mounting linkage is positioned within the internal hollow region of the ferromagnetic insert and extends externally from the central hub.

20. The lift assembly of claim 15, wherein the ferromagnetic insert comprises a first opening in to the cavity and a second opening into the cavity opposite the first opening, wherein the second opening has a larger diameter than the first opening.

* * * * *